US005564004A

United States Patent [19]
Grossman et al.

[11] Patent Number: 5,564,004
[45] Date of Patent: Oct. 8, 1996

[54] METHOD AND SYSTEM FOR FACILITATING THE SELECTION OF ICONS

[75] Inventors: Bertrand M. Grossman, New York, N.Y.; James G. McLean, Boynton Beach, Fla.; Clifford A. Pickover, Yorktown Heights; Michael S. Schwartz, Bronx, both of N.Y.; Daniel J. Winarski, Tucson, Ariz.

[73] Assignee: International Business Machines Corporation, Armonk, N.Y.

[21] Appl. No.: 227,149

[22] Filed: Apr. 13, 1994

[51] Int. Cl.⁶ .................................................. G06F 15/00
[52] U.S. Cl. ............................................ 395/159; 395/155
[58] Field of Search ................................ 395/155–161

[56] References Cited

U.S. PATENT DOCUMENTS

| | | | |
|---|---|---|---|
| D. 297,243 | 8/1988 | Wells-Papanek et al. | D18/27 |
| 4,815,029 | 3/1989 | Barker et al. | 364/900 |
| 5,040,131 | 8/1991 | Torres | 364/521 |
| 5,060,135 | 10/1991 | Levine et al. | 364/200 |
| 5,122,785 | 6/1992 | Cooper | 340/710 |
| 5,140,678 | 8/1992 | Torres | 395/159 |
| 5,363,297 | 11/1994 | Larson | 364/410 |

OTHER PUBLICATIONS

Robert Sedgewick, *Algorithms*, Second Edition, Chapters 27 and 28; Addison–Wesley Publishing Company (1988).
Adrian Nye, *Volume One, Xlib Programming Manual, for Version 11 of the X Window System*, pp. 380–382 and 407; O'Reilly & Associates, Inc. (1988).

*Primary Examiner*—Mark R. Powell
*Assistant Examiner*—U. Chauhan
*Attorney, Agent, or Firm*—Heslin & Rothenberg, P.C.

[57] ABSTRACT

A method and system for facilitating the selection of icons. Those icons which are next likely to be used are selected and automatically moved towards a cursor thereby facilitating selection of the icons. Additionally, those icons likely to be used or other icons selected by a user may track the cursor such that those icons are always close to the cursor and capable of being easily selected. Further, in order to facilitate selection of icons, icons are provided with the capability of announcing themselves when a cursor comes close to the icon. In addition, it is possible to reduce the amount of clutter on a computer display so that icons may be easily selected. In order to clean up a computer display, icons which are least likely to be used are faded, eliminated or shrunk to a smaller size. In another embodiment, icons that are not used very often may disappear into a master icon and further, icons which have a conceptual relationship between them may be linked by a visual graphical representation.

33 Claims, 4 Drawing Sheets fig. 1 fig. 2 fig. 3 fig. 4 fig. 5 fig. 6 fig. 7

METHOD AND SYSTEM FOR FACILITATING THE SELECTION OF ICONS

TECHNICAL FIELD

This invention relates in general to graphical user interfaces and, in particular, to facilitating selection of icons located on a computer display, graphically linking related icons and cleaning up a computer display.

BACKGROUND ART

Very often a computer display will include a number of icons which are used in the selection of a particular command or application program running on the computer system. A typical display will include many icons, each representing a different process, program or command. As one example, a trash can icon can represent a delete command. When a user wishes to select, for instance, the delete command, the user uses a device, such as a pointer or a mouse, to move through the many icons. In particular, the user moves a cursor through the icons over to the trash can and then clicks on the icon in order to select the delete command.

Typically, the icons located on the computer display are stationary. However, in one prior art instance, a selected icon may be dragged over to a desired location on a computer display. This technique is described in U.S. Pat. No. 5,040,131, entitled "Graphical Processing", issued on Aug. 13, 1991 and assigned to International Business Machines Corporation. As described therein, a copy of an icon is dragged to a desired display point by using a press and hold operation of a mouse button.

The prior art techniques of moving through the many icons located on the display and selecting a particular icon are tedious for ordinary users. Further, it is quite difficult for those users with manual dexterity problems to navigate through a complex task and the many icons to select the intended function. Therefore, a need exists for a technique in which the selection of one or more icons on a computer display is facilitated. A further technique is needed for cleaning up a computer display such that it is easier for a user to locate and select a particular icon. A further need exists for a technique to consolidate one or more icons such that the number of icons displayed are reduced, thereby facilitating selection. Also, a need exists for graphically linking one or more icons.

SUMMARY OF THE INVENTION

The shortcomings of the prior art are overcome and additional advantages are provided through the provision of a method for facilitating selection of one or more of a plurality of icons located on a computer display. A determination is made as to which of the plurality of icons are next likely to be used. Those icons which are next likely to be used are automatically moved towards a cursor located on the computer display. In one embodiment, those icons next likely to be used are selected based on a predefined likeliness criteria. In another embodiment, the likeliness criteria may be updated.

In yet another embodiment of the invention, a cursor located on a computer display is tracked by one or more icons. The location of the cursor is determined and one or more icons selected to track the cursor are positioned a predetermined distance from the cursor location.

In another embodiment of the invention, a method is provided for facilitating selection of one of a plurality of icons located on a computer display. A cursor located on a computer display is moved within a predetermined distance from an icon to be selected. The predetermined distance is close to but not touching the icon. When the cursor is within the predetermined distance, the icon is selected. In one embodiment, the predetermined distance is computed using a Voronoi polygon associated with the icon to be selected.

In yet a further embodiment of the invention, a method for graphically linking one or more of a plurality of icons located on a computer display is provided. A determination is made as to which of the plurality of icons are to be linked and a graphical representation is drawn between those icons. In one example, the graphical representation may be a chain which has a number of predefined characteristics. A predefined characteristic could include color intensity in which the intensity is in proportion to an amount a linked icon is used.

In a further embodiment of the invention, a method for facilitating selection of one or more of a plurality of icons located on a computer display is provided. A selection is made of one or more icons located on a computer display to announce itself. The selected icons then make the announcement. In one embodiment, in order to select the icons to make an announcement, a determination is made as to the location of the cursor on the computer display. Then, a further determination is made as to which of the icons are within a predetermined distance from the cursor location. Those icons within the predetermined distance are the selected icons.

A further embodiment of the invention includes a method for consolidating icons displayed on a computer display. A determination is made as to one or more icons to be consolidated and those icons are consolidated into a master icon, whereby the consolidated icons are hidden from view. The master icon comprises one or more graphical symbols indicating the consolidated icons. In one example, the icons to be consolidated are those that are not likely to be used within a predetermined amount of time.

In yet another embodiment of the invention, a method for cleaning up a computer display having a plurality of icons is provided. The likeliness that one or more icons will be used within a predefined amount of time is determined. The appearance of those icons determined not likely to be used within the predetermined amount of time is gradually changed. In one example, the speed at which the gradual changing takes place is capable of being varied.

In another aspect of the invention, a system for facilitating selection of one or more of a plurality of icons located on a computer display is provided. The system includes means for determining which of the plurality of icons are next likely to be used and means for automatically moving the one or more next likely icons towards a cursor located on the computer display.

In a further aspect of the invention, a system for tracking a cursor located on a computer display is provided. The system includes means for determining a location on the computer display of the cursor, means for, selecting from a plurality of icons located on the computer display one or more icons to track the cursor, and means for positioning the one or more icons within a predetermined distance from the cursor location.

In yet another aspect of the invention, a system for facilitating selection of one of a plurality of icons located on a computer display is provided. Means for moving a cursor located on the computer display within a predetermined distance from an icon to be selected is provided. The predetermined distance is close to but not touching the icon. Also provided is means for selecting the icon when the cursor has moved within the predetermined distance.

In yet a further aspect of the invention, a system for graphically linking one or more of a plurality of icons located on a computer display is provided. The system includes means for determining which of the plurality of icons are to be linked and means for drawing a graphical representation between the icons to be linked.

In a further aspect of the invention, a system for facilitating selection of one or more of a plurality of icons located on a computer display is provided. Means are provided for selecting from the plurality of icons, one or more icons to announce itself, such that one or more selected icons are provided. Means are also provided for having each of the one or more selected icons make an announcement.

In yet another aspect of the invention, a system for consolidating icons displayed on a computer display is provided. The system includes means for determining one or more icons to be consolidated and means for consolidating the one or more icons into a master icon whereby consolidated icons are hidden from view.

In yet another aspect of the invention, a system for cleaning up a computer display having a plurality of icons is provided. Means are provided for determining for one or more of the plurality of icons the likeliness that the one or more icons will be used within a predefined amount of time. Means are also provided for gradually changing the appearance of the one or more icons determined not likely to be used within the predefined amount of time.

In accordance with the principles of the present invention, several techniques are provided for facilitating selection of one or more of a plurality of icons located on a computer display. One or more of these techniques help navigate through complex tasks and enable the selection of a particular icon more quickly. One or more of the techniques can serve as a manual dexterity prosthesis for people with manual dexterity problems. Further, one or more embodiments may help those having impaired hearing or vision. Further, one or more techniques may be used to reduce processing time of the computer system by closing out those icons which are very unlikely to be used.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

BEST MODE FOR CARRYING OUT THE INVENTION

Figure 1:
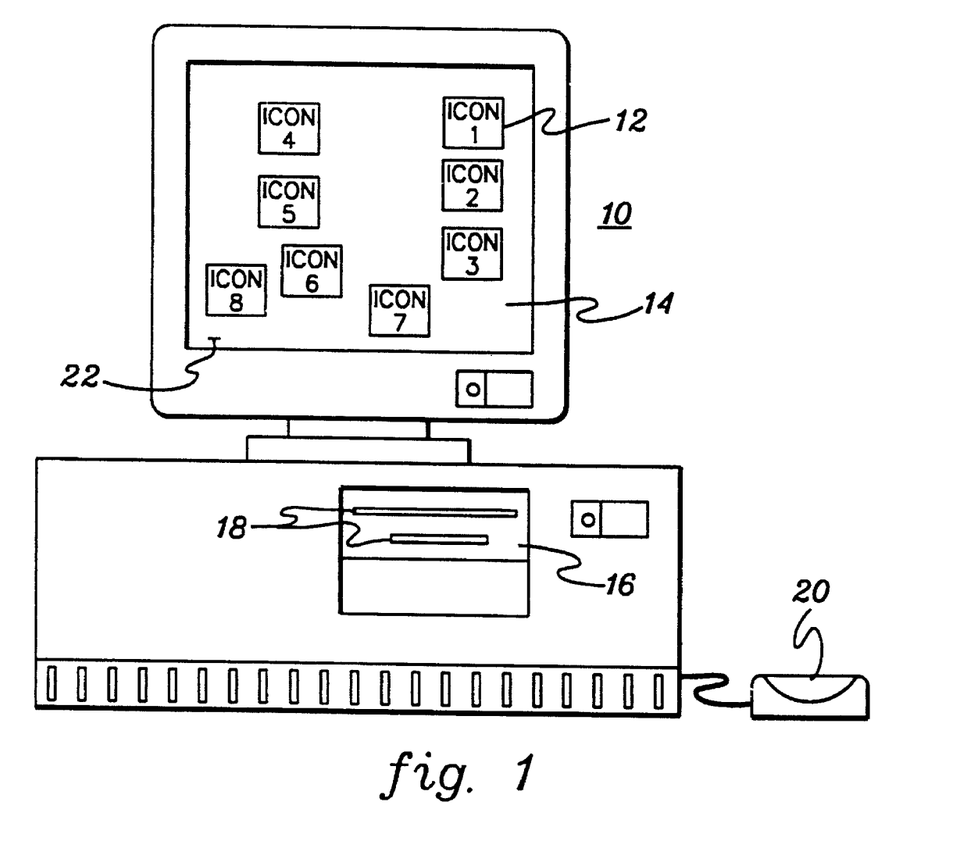
FIG. 1 depicts one example of a typical computer having a plurality of icons located on a computer display.

In accordance with the principles of the present invention, techniques are provided for facilitating the selection of one or more icons located on a computer display. In one example, a user of a typical computer 10 (FIG. 1) has the opportunity to select from many icons 12 located on a computer display 14. Computer 10 is, for instance, an IBM PS/2 or an IBM RISC/6000. In one example, computer 10 includes a disk drive 16 for receiving and storing information on disks, which are input, for example, at one or more of slots 18. Additionally, computer 10 includes a mouse 20 for controlling the positioning of a cursor 22 on computer display 14. It is well understood in the art that cursor 22 may also be controlled by keys on a keyboard, a pointer, a touch of the display or in any other manner.

As used herein, computer display includes a two-dimensional screen, a three-dimensional screen or any other medium that is capable of displaying icons. An icon is, for instance, a graphical representation or picture that represents a particular object or command, a menu item, a window in a window environment, written text or any entity that can be selected. It may be two or three-dimensional.

Figure 2:
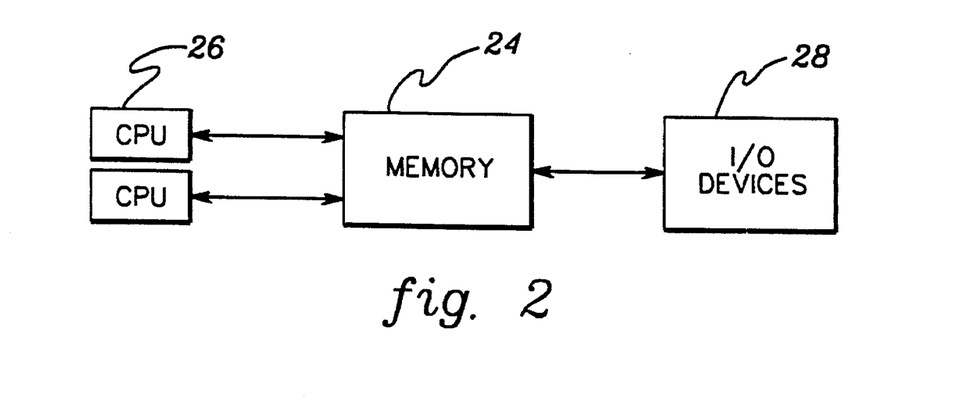
FIG. 2 depicts one embodiment of the hardware components associated with the computer of FIG. 1.

Referring to FIG. 2, computer 10 also includes, for example, a memory 24, one or more central processing units 26 and one or more input/output devices 28. Each of these components is discussed below.

In general, central processing units 26 contain the sequencing and processing facilities associated with the techniques of the present invention and for instruction execution, interruption action, timing functions, initial program loading and other machine related functions. Central processing units 26 are coupled to memory 24, which is directly addressable and provides for high speed processing of data by the CPUs. In one embodiment, memory 24 may include either real and/or virtual memory and may be either physically integrated with the CPUs or constructed in stand-alone units.

Memory 24 is further coupled to input/output devices 28. Data is transferred from memory 24 to input/output devices 28 and from the input/output devices back to memory. In one embodiment, the data transferring operation associated with input/output devices 28 is synchronous to the execution of instructions on the CPU.

In one embodiment, a technique of the present invention allows for one or more icons 12 to move towards cursor 22 in an effort to help users of computer 10 navigate through complex tasks or to serve as a manual dexterity prosthesis for people with manual dexterity problems. As described in detail below, in one example, one or more icons located on the display automatically move towards the current location of the cursor. Thus, a visual suggestion of the icons next likely to be selected is provided, thereby facilitating the selection of a particular icon. One embodiment of a technique for facilitating selection of an icon is described in detail with reference to FIG. 3.

Figure 3:
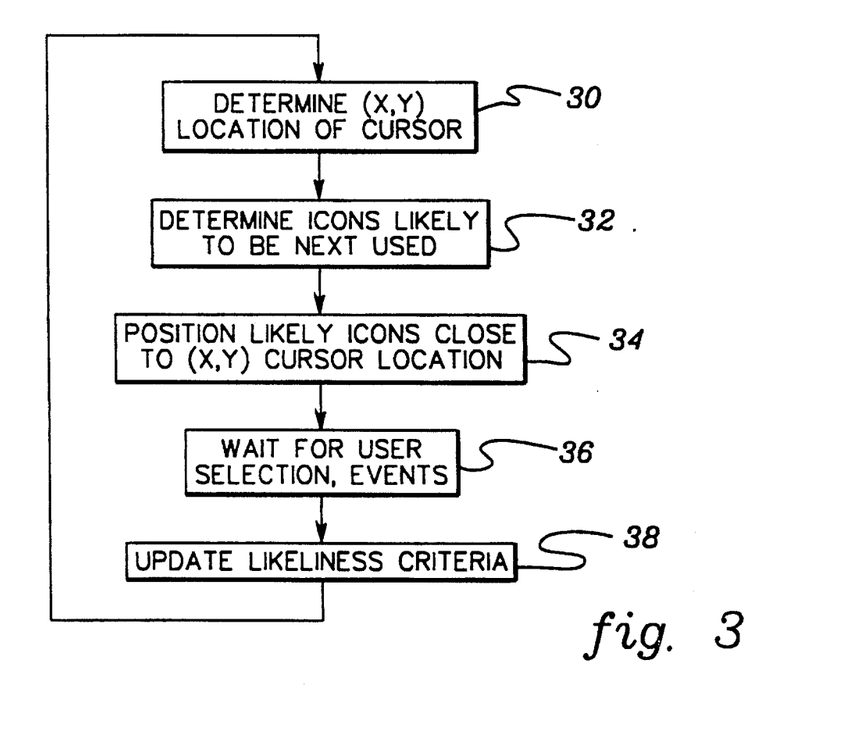
FIG. 3 depicts one embodiment of the logic associated with a technique for automatically moving icons towards a cursor, in accordance with the principles of the present invention.

Referring to FIG. 3, initially, a determination is made as to the location of cursor 22, STEP 30 "DETERMINE (X,Y) LOCATION OF CURSOR". In one instance, computer 10 is running a copy of Windows offered by Microsoft, Inc., and the X and Y coordinates of the cursor are determined by a standard query offered in the Windows environment.

After the location of the cursor is determined, a further determination is made as to which of the icons located on computer display 14 are next likely to be used, STEP 32 "DETERMINE ICONS LIKELY TO BE NEXT USED". The icons next likely to be used may be determined in a number of ways. For instance, likeliness criteria for each icon can be stored on disk or within memory 24. In particular, a user profile is set up, which includes the icons on the display and the likeliness criteria, which can be periodically updated. As examples, the likeliness criteria may indicate the probability that a specific icon will be used after a specific event or it can include an overall probability of use or a probability of use based on past usage. For example, a user can set up a profile which includes each icon and a probability that the icon will be used. In one instance, the user has a profile in which ICON A has a use probability of 80%, ICON B 15% and ICON C 5%, etc. In another example, the profile includes a list of all the icons and the probability of usage for each icon, which is dependent on a particular event. For instance, the profile may include ICON A and ICON B and an indication that ICON A has a 90% use probability after using ICON B and ICON B has a 20% use probability after using ICON A.

In yet another example, the user does not set up a profile but uses a program to monitor and determine the probability that one icon will be used or the probability that one icon will be used after a particular icon or a particular event. In this example, as icons are used, the program automatically updates the likeliness criteria.

After selecting which icon or icons are likely to be used next, those likely icons are positioned close to the (X,Y) cursor location determined in STEP 30, STEP 34 "POSITION LIKELY ICONS CLOSE TO (X,Y) CURSOR LOCATION". In particular, the likely icons are moved within a predetermined distance, D, from the current cursor location (X,Y). In one example, the predetermined distance may be, for instance, 100 pixels. For example, assuming that a screen has 1000×1000 pixels and the cursor is currently located at 500,500, a likely icon may be moved to position 600,500. If there is more than one icon to be moved, the additional likely icons can be spaced a certain distance apart from each other. For example, the next icon could be spaced at 500,600 and etc. The manner in which a plurality of icons is positioned could, for example, be stored in memory or on disk as a canned arrangement, or it can be set each time by an application or user.

In one embodiment, the likely icons are moved by, for example, redrawing them at the new location using standard techniques. Alternatively, an animated effect can be achieved by redrawing the icons several times, each time closer to their final position. This would give an appearance of gradual movement.

Subsequent to positioning the likely icons close to the cursor, the user makes a selection of a particular icon or a specific event occurs, STEP 36 "WAIT FOR USER SELECTION, EVENTS". In one embodiment, the icon selection is made by using mouse 20. Mouse 20 positions the cursor on a particular icon and then by clicking a button on the mouse, a selection is made. (Another embodiment for making a selection is described below with reference to FIG. 6.)

Thereafter, the likeliness criteria is updated, STEP 38 "UPDATE LIKELINESS CRITERIA". In one embodiment, in order to update the likeliness criteria, the stored data is updated in a conventional manner by the user or a program. Subsequently, flow passes back to STEP 30 "DETERMINE (X,Y) LOCATION OF CURSOR" and the technique described above is repeated.

It will be apparent to one of ordinary skill in the art that the technique described above is just one example of how icons can be moved close to a cursor. This technique may be varied without departing from the spirit of the invention.

In accordance with the principles of the present invention, selection of an icon is also facilitated by the fact that one or more icons track or follow the cursor. The icons to track may be, for example, the icons determined above to be the next likely icons to be used or they may be other icons, as described below. One technique for tracking a cursor is described below with reference to FIG. 4.

Figure 4:
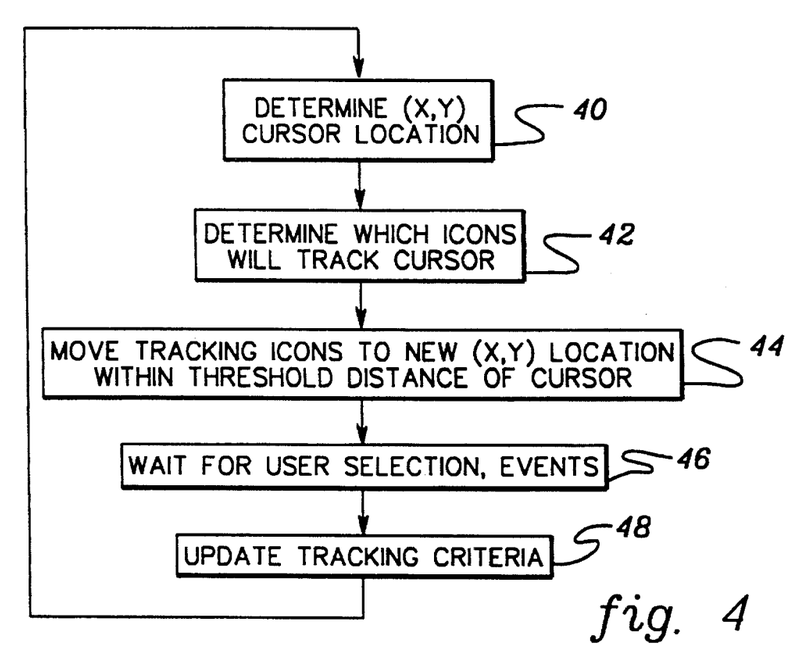
FIG. 4 depicts one embodiment of the logic associated with tracking a cursor by one or more icons, in accordance with the principles of the present invention.

Initially, a determination is made as to the location of the cursor, STEP 40 "DETERMINE (X,Y) CURSOR LOCATION". This may be accomplished as described above with reference to STEP 30. Thereafter, a further determination is made as to which icons will track the cursor, STEP 42 "DETERMINE WHICH ICONS WILL TRACK CURSOR". In order to make this determination, a number of techniques may be used. For example, tracking criteria may be stored in memory or on disk, which indicates which icons should track the cursor. In another example, those icons to track the cursor are those icons which are next likely to be used, as described above. Additionally, icons may be trained for a particular use or application. For example, if after performing a certain action (e.g., selecting from a menu, pointing to an object or running a particular program), user A selects ICON B 90% of the time, then ICON B will be drawn to the cursor when that specific action is being performed. In accordance with the principles of the present invention, low probability icons are positioned furthest from the cursor.

Once it is determined which icons will track the cursor, those icons are moved or positioned within a predetermined distance from the cursor, STEP 44 "MOVE TRACKING ICONS TO NEW (X,Y) LOCATION WITHIN THRESHOLD DISTANCE OF CURSOR". In particular, a predetermined distance is computed, retrieved from storage or provided by the user or an application program and the icons are moved within the predetermined distance, as described above. As used herein, move may refer to a continuous movement or to a jump to a particular location.

Subsequent to moving the tracking icons close to the cursor, the user makes a selection or a particular event occurs, STEP 46 "WAIT FOR USER SELECTION, EVENTS". Thereafter, the tracking criteria is updated by the user or a program, STEP 48 "UPDATE TRACKING CRITERIA", and flow returns to STEP 40 "DETERMINE (X,Y) CURSOR LOCATION".

In order to track the cursor, the above procedure would be performed each time the cursor moved. Thus, as the cursor moves, so do the tracking icons.

Figure 5:
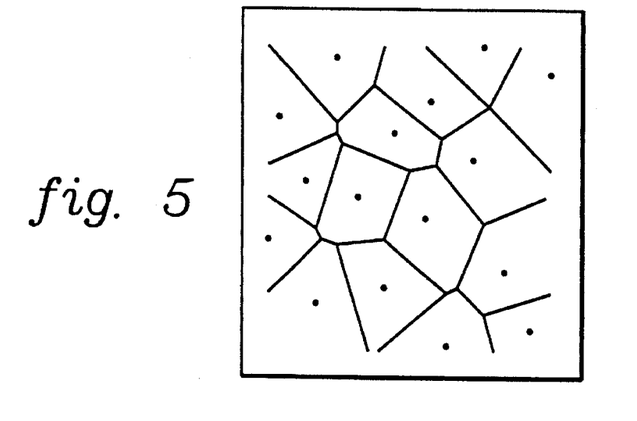
FIG. 5 depicts one example of a Voronoi diagram.

As described above, a user may select an icon by touching the icon and then clicking on, for example, a mouse button. In another embodiment, however, a technique is provided in which an icon may be selected without the user's cursor actually touching the icon. In accordance with the principles of the present invention, the user may merely place the cursor close to the icon to trigger it. In particular, the set of all points closest to the center of a given icon in an icon set than to all other icons in the set is computed. This set of points is a geometrical structure called a Voronoi polygon for the icon. The Voronoi polygon for an icon is made up of the perpendicular bisectors of the segments linking the center of the icon to those centers closest to it. Voronoi polygons are described in detail in *Algorithms*, by Robert Sedgewick, published by Addison-Wesley, 1988, Chapter 28, which is hereby incorporated by reference. The union of all the Voronoi polygons for an icon set is called an icon Voronoi diagram. One example of a Voronoi diagram is depicted in FIG. 5, in which each dot represents an icon.

Figure 6:
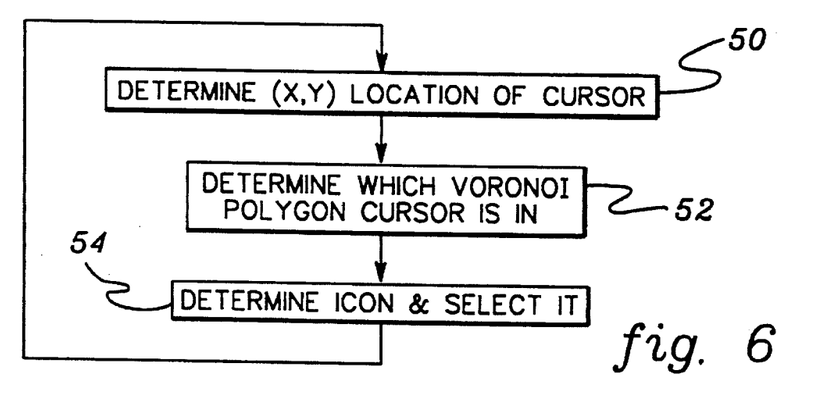
FIG. 6 depicts one embodiment of the logic associated with a technique for selecting an icon by moving a cursor close to the icon, in accordance with the principles of the present invention.

One example of the technique for selecting an icon by placing the cursor close to it is described with reference to FIG. 6. Initially, the (X,Y) location of the cursor is determined, as described above, STEP 50 "DETERMINE (X,Y) LOCATION OF CURSOR". Thereafter, in one embodiment, a determination is made as to which Voronoi polygon the cursor is in, STEP 52 "DETERMINE WHICH VORONOI POLYGON CURSOR IS IN". This determination is made by conventional techniques. One technique is described in Chapter 27 of *Algorithms* by Robert Sedgewick, published by Addison-Wesley in 1988, which is hereby incorporated by reference. If an icon is on the boundary of two or more polygons, then any one of the polygons may be selected based on predefined criteria. One example of predefined criteria would be a probability of use as determined from past history of use. Voronoi diagrams have many properties that lead to efficient algorithms for closest icon determination, and it is possible to organize Voronoi polygons in a structure like a two-dimensional tree to allow searching to be done efficiently.

After determining which Voronoi polygon the cursor is in, the icon located within that polygon is determined and selected, STEP 54 "DETERMINE ICON & SELECT IT". As one example, the icon is selected by using a mouse to position the cursor within the appropriate Voronoi polygon and then clicking on the mouse button.

A new set of Voronoi polygons is computed every time an icon is moved. If icons are static and no new icons are introduced, computation only needs to be performed once.

As described above, one technique of the present invention allows a cursor located on a computer display to be moved within a predetermined distance from an icon to be selected. The predetermined distance is close to but not touching the icon. Once the cursor is moved within the predetermined distance, the icon may be selected.

In another embodiment of the invention, selection of icons is facilitated by having one or more icons announce its presence. In particular, in order to help users navigate through complex multi-icon screens, one or more icons would talk or display text indicating, for instance, what the icon does and where it is in relation to the cursor. In one example, the icons would remain stationary and as the cursor approaches an icon, the icon would announce itself. In another embodiment, however, the announcing icons may be the very icons that move close to the cursor or track the cursor, as described above.

Figure 7:
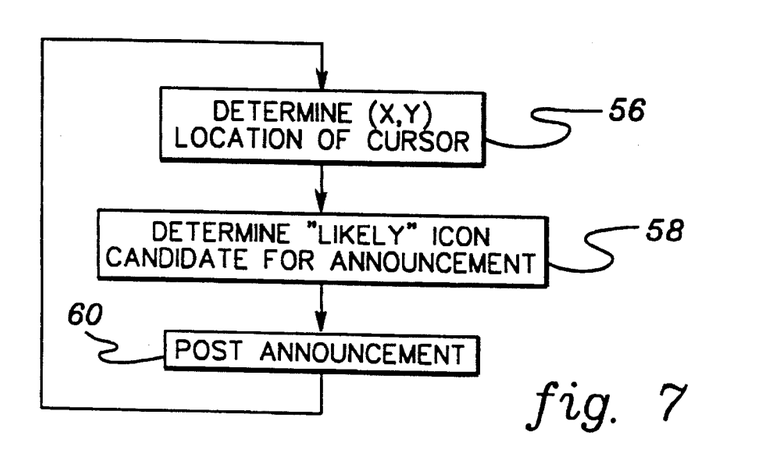
FIG. 7 depicts one example of the logic associated with a technique for having an icon announce its presence, in accordance with the principles of the present invention.

One embodiment of the technique in which icons announce themselves, in accordance with the principles of the present invention, is described below with reference to FIG. 7. Initially, the (X,Y) cursor location is determined, as described above, STEP 56 "DETERMINE (X,Y) LOCATION OF CURSOR". Then, a determination is made as to the likely icon candidate(s) for announcement, STEP 58. In one example, the likely icon candidates for announcement are those icons which are within a predetermined distance, such as 100 pixels, from the cursor location. The predetermined distance can be changed to suit a particular user's needs or can be dynamically altered. In determining the icons within the predetermined distance, it is possible to use known techniques for analyzing nearest neighbor problems where all distances from the cursor to all the icons are computed and rapidly sorted. Round robin methods are also applicable so that multiple icons can speak in turn.

In another example, the icon to announce itself may be based on prior usage or based on a particular application. For example, if ICON B is likely to be used after ICON A, then if ICON A is being used, ICON B will announce itself when the cursor is in its vicinity.

After determining the likely icon candidates for announcement, the announcement is made, STEP 60 "POST ANNOUNCEMENT". In one example, the announcement may be a sound announcement. In particular, an icon may announce its presence by stating, for instance, "TO SELECT X, MOVE YOUR CURSOR UP AND TO THE LEFT PLEASE". The use of speech synthesis with personal computer applications is well known and easily adapted for this invention. Such an announcement may have particular value for the visually impaired or for children. In another embodiment, the announcement may be made by including a closed capturing system in which a display is placed next to the icon. This announcement would aid the hearing impaired. It may also be useful in multimedia applications, museum and shopping mall kiosks, video games, etc.

In a further embodiment, the talking icon may be visually represented by, for instance, moving small lips on the body of the icon. The lips can move according to the simultaneous speech so that lip readers can take advantage of this feature. It is also possible to turn-off the announcing feature if a user so desires.

In a further effort to facilitate selection of icons and in order to remove the clutter from many computer displays, an icon consolidation technique is provided, in accordance with the principles of the present invention. In particular, in the course of a user's interaction with the computer, many icons on the display may not have been used for a predetermined amount of time, such as for several hours or days and, therefore, these icons may be consolidated such that the number of icons on the display is reduced. In accordance with the present invention, the icons least likely to be used or those that have not been used for a predetermined amount of time are conveniently managed and represented by a master icon.

One technique for consolidating icons located on a computer display is described in detail with reference to FIG. 8. Initially, a determination is made as to whether any of the icons should disappear and be incorporated into a master icon, INQUIRY 70 "SHOULD ANY ICONS DISAPPEAR?". This determination may be made, for example, by having a profile that specifies the rules by which icons are consolidated, or it may be based on a likeliness criteria, as described above. For example, if an icon has not been used for a predetermined amount of time, such as for instance, a number of hours or days, then it is considered unlikely to be used soon or very often and, therefore, should disappear and be incorporated into the master icon. In one instance, the master icon can be two or three-dimensional and can be rotated if desired.

If it is determined that one or more icons should be consolidated, then the icons disappear and the master icon graphically changes as needed, STEP 72. In particular, in one example, the color intensity of the icons to disappear is dimmed such that the icons are not visible and the master or repository icon gives an indication of the number of icons it represents by displaying a number, color or other graphical symbol. In one embodiment, as shown in FIG. 9a, the icon gives an indication by displaying a graphical symbol, such as a tab. In particular, an icon 74 has tabs 76 protruding from its periphery. Each tab represents, for example, a consolidated icon. In another example, one tab can represent a group of tasks, such as system utilities or personal software. A tab may be added by using conventional graphical software. In addition to the above, in a further embodiment, the tabs may have a particular color or label.

Figures 8, 9A, 9B:
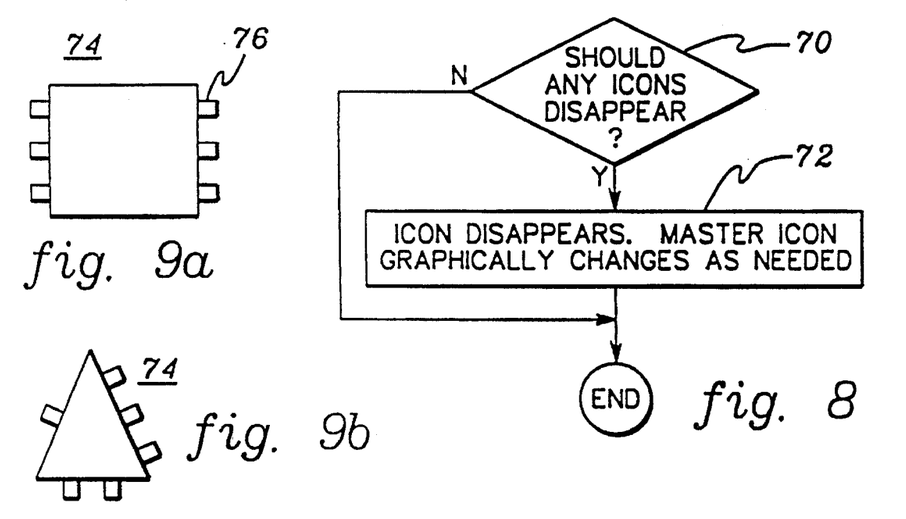
FIG. 8 depicts one example of the logic associated with a technique for consolidating icons located on a computer display, in accordance with the principles of the present invention.
FIGS. 9a–9c depict examples of a master icon with graphical symbols attached thereto, in accordance with the principles of the present invention.
Figure 9C:
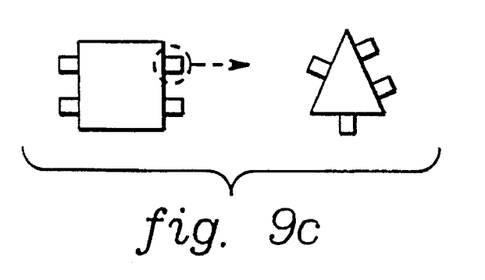

In another example, the master icon can be polygonal, in which the number of sides relates to the number of categories in which the tabs are to be placed (refer to FIG. 9b). For instance, a triangular master icon can indicate three categories of tabs: system commands, user commands and commands for a particular application, as one example. In yet a further embodiment, the master icon can be hierarchial in which one tab may be used to trigger another polygon or icon with tabs, as illustrated in FIG. 9c.

In accordance with the principles of the present invention, as an icon is incorporated into the master icon, a tab representing the incorporated icon is added to the master icon, if it is not already there, as in the case of a tab representing a group. Likewise, when an icon reappears on the display, the tab is deleted, as long as there are no other icons being represented by the tab. In one embodiment, if the system expects that an icon, such as ICON B, is going to be used after ICON A, then ICON B is retrieved and the master icon is altered, as appropriate.

In a further effort to clean up a computer display or a messy desk top, a technique is provided wherein the visual clutter is reduced by gradually removing those elements from the display which have not been recently used, and optionally, closing the associated computer sessions in order to reduce the processor load. As described below, in accordance with the principles of the present invention, desk top elements, such as icons, which have not been used for some time or with a low expected probability of use have a gradual change in their appearance. As examples, they may grow hazy or fade into the background, their actual dimensions may be changed so that they shrink until they disappear or they shrink along one dimension appearing to be squashed, they move or drift to the edge of the display or they have an intensity border which grows along the perimeters of the icons the longer the icons have been inactive. With the intensity border, in a further example, once the border is complete, the icon is considered unused beyond a predefined time-out limit and it is removed from the screen. Selecting the icon would reset the intensity border. For instance, a 3600 pixel border could have one pixel illuminated every one second. At the end of one hour, for this example, the icon's intensity border would be complete and the inactive icon would be removed to free system resources, such as, for example, an OS/2 thread.

In accordance with the principles of the present invention, any time an icon is selected, used or moved, the gradual changing of the appearance ends and the element (i.e., the icon) assumes its full intensity. Therefore, if a user notices that an icon the user intends to use later is fading, the user may simply click on that icon to return it to full intensity.

Figure 10:
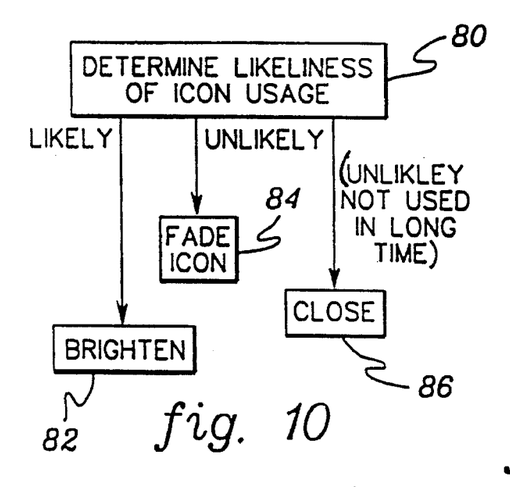
FIG. 10 depicts one example of the logic associated with a technique for cleaning up a computer display, in accordance with the principles of the present invention.

One embodiment of the technique for cleaning up a computer display, in accordance with the present invention, is described with reference to FIG. 10. Initially, for each icon, a determination is made as to whether the icon is likely to be used, STEP 80 "DETERMINE LIKELINESS OF ICON USAGE". This determination may be made in a number of ways, as described above. Based on the likeliness determination, in one example, the intensity of the icon will remain the same or be dimmed. In one example, if it is likely that the icon will be used, then the color intensity associated with that icon is bright, STEP 82. If, however, it is unlikely that the icon will be used, then the icon will fade by dimming its color intensity, STEP 84. In particular, in order to dim color intensity, the red, green and blue percent intensities of each pixel are gradually incremented towards the background intensities. Further, if it is very unlikely that an icon will be used, since, for instance, it has not been used in a long time, then that icon may be closed, STEP 86.

In one embodiment, when an element fades away, a user can select whether it will be a hard or a soft disappearance. For a hard disappearance, the session represented by the faded element is automatically closed by the system. This frees up system resources for use by other sessions. If a program is active in the faded session, the user may elect to be prompted before the session is shut down. One technique for closing a session is described in, for instance, *Xlib Programming Manual*, by Adrian Ney, published by O'Reilly & Associates, Inc. in 1988, Pages 380–382 and 407, which are incorporated herein by reference.

For a soft disappearance, the element disappears from view on the display, but remains as a logical session within the operating system. While the soft disappearance does not free up processor capacity, it does serve to reduce desk top clutter in a non-intrusive, recoverable way.

In one embodiment of the present invention, the speed at which an icon is faded can be varied. Additionally, fading can be selectively performed on a basis of time (i.e., as an example, 1% fade per minute of non-use) or on a basis of icon selection (i.e., for example, a 4% fade each time another icon is selected). A combination of the above may also be employed. Further, the fade time for each icon can be set individually.

It is further possible to exempt certain icons from fading such that those icons are always available. The no-fade option could be chosen, for example, from a pop-up setting window in OS/2.

In a further aspect of the invention, a technique is provided for graphically linking one or more icons located on a computer display in order to indicate conceptual or software relationships. The graphical linking helps users understand the inter-relatedness of various processes and functions. In one example, a program may be linked with the help key to show that there is a relationship between the help and program icons. Additionally, graphical linking can indicate and characterize the inter-relatedness of parent/children processes, and also two windows in the same application, which are currently both iconified.

Figure 11:
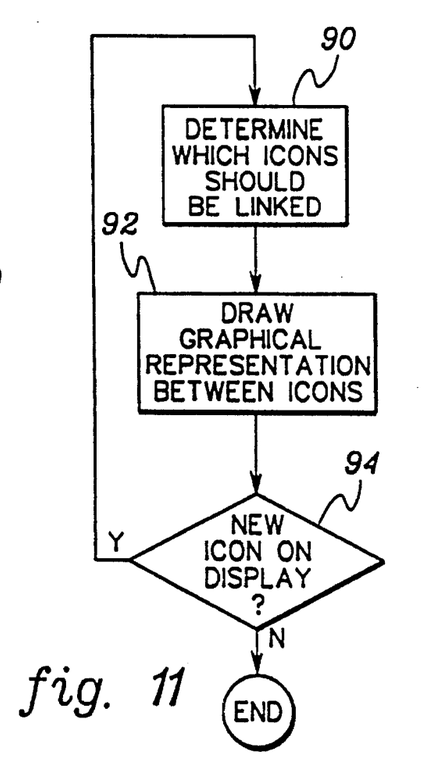
FIG. 11 depicts one embodiment of the logic associated with a technique for graphically linking one or more icons, in accordance with the principles of the present invention.

One embodiment of the technique for graphically linking one or more icons on a computer display is described with reference to FIG. 11. Initially, a determination is made as to which icons should be linked, STEP 90 "DETERMINE WHICH ICONS SHOULD BE LINKED". This determination may be made by retrieving data pre-stored in memory or it may be made by, for example, a likeliness criteria in which the probability that one icon will be selected after another is used to show that those icons are related and should be linked. For instance, those icons to be linked are those icons which have a likeliness probability greater than a predetermined probability. In another example, if a user 90% of the time selects ICON A after ICON B, the linking system can learn to link ICON A and ICON B after A is selected, or even before A is selected for this high probability coupling.

After the icons to be linked are determined, a graphical representation is drawn between those icons, STEP 92 "DRAW GRAPHICAL REPRESENTATION BETWEEN ICONS". In one example, the graphical representation is a chain. The color and thickness of the chain may, for instance, indicate the degree of conceptual linkage. In another embodiment, parts of the chain may fade in proportion to an icon's usage or priority. When an icon is no longer linked to a process through the course of an application, program execution or user determination, then the chain can disappear. New chains can form as applicable. The presence, position, visual and animated characteristics of the chain could be set by an application program or could be created by a master task or the operating system itself.

In another embodiment, it is also possible to taper the size of the chain to indicate the relationship between the icons. Further, the chain can provide a visual indication of security. That is, if repeated attempts to access a privileged icon is made, the chain can be broken, indicating such attempts.

Subsequent to drawing the graphical representation between the icons, a determination is made as to whether there is a new icon on the display, INQUIRY 94 "NEW ICON ON DISPLAY?". If there is a new icon on the display, then flow passes back to STEP 90 to determine which icons should be linked. If there are no new icons, then the procedure is complete.

Described above are a number of techniques for facilitating the selection of one or more icons located on a computer display. Further, techniques are provided in which the computer display may be cleaned up and a graphical representation between icons may be presented.

It will be apparent to those of ordinary skill in the art that the techniques described herein could be applied to many types of computer systems using graphical user interfaces including, for instance, IBM PS/1 and PS/2 systems and PC compatibles running Windows or DOS, and RS/6000 and other AIX work stations using graphical AIX interfaces.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for facilitating selection of one or more of a plurality of icons located on a computer display, said method comprising the steps of:

determining which of said plurality of icons are next likely to be used, such that one or more likely icons are selected; and automatically moving said one or more likely icons towards a cursor located on said computer display.

2. The method of claim 1, wherein said automatically moving step comprises determining a location of said cursor on said computer display.

3. The method of claim 1, wherein said determining step comprises selecting from predefined likeliness criteria said one or more likely icons.

4. The method of claim 3, further comprising the step of updating said likeliness criteria.

5. The method of claim 1, further comprising selecting one of said one or more likely icons.

6. The method of claim 5, wherein said selecting step comprises:

moving said cursor within a predetermined distance from an icon to be selected, said predetermined distance being close to, but not touching said icon; and selecting said icon when said cursor has moved within said predetermined distance.

7. The method of claim 6, further comprising computing said predetermined distance wherein said computing step comprises determining a Voronoi polygon associated with said icon to be selected.

8. The method of claim 1, further comprising tracking said cursor by said one or more likely icons.

9. The method of claim 8, wherein said tracking comprises:

determining a location of said cursor when said cursor moves; and positioning said one or more likely icons within a predetermined distance from said location.

10. The method of claim 1, further comprising said one or more likely icons announcing itself as it approaches said cursor.

11. A method for tracking a cursor located on a computer display, said method comprising the steps of:

determining a location on said computer display of said cursor;

selecting from a plurality of icons located on said computer display one or more icons to track said cursor; and positioning said one or more icons within a predetermined distance from said location.

12. The method of claim 11, wherein said determining, selecting and positioning steps are repeated each time said cursor moves to a new location.

13. The method of claim 11, wherein said selecting step comprises:

determining which of said plurality of icons are next likely to be used, such that one or more likely icons are provided; and selecting from said one or more likely icons those icons to track said cursor.

14. The method of claim 11, wherein said selecting step comprises selecting said one or more icons based on a predefined tracking criteria.

15. The method of claim 14, further comprising updating said predefined tracking criteria.

16. A system for facilitating selection of one or more of a plurality of icons located on a computer display, said system comprising:

means for determining which of said plurality of icons are next likely to be used, such that one or more likely icons are selected; and means for automatically moving said one or more likely icons towards a cursor located on said computer display.

17. The system of claim 16, wherein said automatically moving means comprises means for determining a location of said cursor on said computer display.

18. The system of claim 16, wherein said determining means comprises means for selecting from predefined likeliness criteria said one or more likely icons.

19. The system of claim 18, further comprising means for updating said likeliness criteria.

20. The system of claim 16, further comprising means for selecting one of said one or more likely icons.

21. The system of claim 20, wherein said selecting means comprises:

means for moving said cursor within a predetermined distance from an icon to be selected, said predetermined distance being close to, but not touching said icon; and means for selecting said icon when said cursor has moved within said predetermined distance.

22. The system of claim 21, further comprising means for computing said predetermined distance wherein said computing means comprises means for determining a Voronoi polygon associated with said icon to be selected.

23. The system of claim 16, further comprising means for tracking said cursor by said one or more likely icons.

24. The system of claim 23, wherein said tracking means comprises:

means for determining a location of said cursor when said cursor moves; and means for positioning said one or more likely icons within a predetermined distance from said location.

25. The system of claim 16, further comprising means for said one or more likely icons announcing itself as it approaches said cursor.

26. A system for tracking a cursor located on a computer display, said system comprising:

means for determining a location on said computer display of said cursor;

means for selecting from a plurality of icons located on said computer display one or more icons to track said cursor; and means for positioning said one or more icons within a predetermined distance from said location.

27. The system of claim 26, wherein said selecting means comprises:

means for determining which of said plurality of icons are next likely to be used, such that one or more likely icons are provided; and means for selecting from said one or more likely icons those icons to track said cursor.

28. The system of claim 26, wherein said selecting means comprises means for selecting said one or more icons based on a predefined tracking criteria.

29. The system of claim 28, further comprising means for updating said predefined tracking criteria.

30. A method for facilitating selection of one of a plurality of icons located on a computer display, said method comprising the steps of:

moving a cursor located on said computer display within a predetermined distance from an icon to be selected, said predetermined distance being close to, but not touching said icon;

selecting said icon when said cursor has moved within said predetermined distance; and computing said predetermined distance wherein said computing step comprises determining a Voronoi polygon associated with said icon to be selected.

31. The method of claim 30, wherein said icon is selected when said cursor is located within said Voronoi polygon.

32. A system for facilitating selection of one of a plurality of icons located on a computer display, said system comprising:

means for moving a cursor located on said computer display within a predetermined distance from an icon to be selected, said predetermined distance being close to, but not touching said icon;

means for selecting said icon when said cursor has moved within said predetermined distance; and means for computing said predetermined distance wherein said computing means comprises means for determining a Voronoi polygon associated with said icon to be selected.

33. The system of claim 32, wherein said icon is selected when said cursor is located within said Voronoi polygon.

* * * * *